United States Patent [19]

Bos et al.

[11] 3,729,823

[45] May 1, 1973

[54] RECIPROCATION DRIVE AND COUNTERWEIGHT ARRANGEMENT FOR POWER SAWS

[75] Inventors: John R. Bos, Grand Haven; Clarence A. Sorensen, Fruitport; Laurens Van Elzelingen, Grand Haven, all of Mich.

[73] Assignee: Gardner-Denver Company, Quincy, Ill.

[22] Filed: May 5, 1971

[21] Appl. No.: 140,391

[52] U.S. Cl. ..........................................30/394, 74/44
[51] Int. Cl. ................................................B27b 19/04
[58] Field of Search...............74/44, 50; 143/68 R, 143/68 C, 68 D, 72, 80; 30/392, 394

[56] References Cited

UNITED STATES PATENTS

| 3,016,932 | 1/1962 | Jacobson | 143/68 D |
| 2,138,862 | 12/1938 | Johnston | 74/44 |
| 3,017,779 | 1/1962 | Beals | 74/50 |
| 785,553 | 3/1905 | Hoornbeek | 74/44 |

FOREIGN PATENTS OR APPLICATIONS

| 1,129,935 | 3/1955 | France | 143/68 R |

*Primary Examiner*—Andrew R. Juhasz
*Assistant Examiner*—James F. Coan
*Attorney*—Michael E. Martin

[57] ABSTRACT

A drive arrangement for a portable reciprocating power saw or the like including a crankshaft having a pair of closely spaced opposed crank throws and connecting rods attached to each throw. One connecting rod is connected to a tubular reciprocating blade drive member and the other connecting rod is connected to a cylindrical counterweight slidably housed in telescoping relationship within the tubular blade drive member. The saw blade drive member and counterweight reciprocate in opposite directions along a common axis and the saw blade drive member also serves as a bearing support for the counterweight.

5 Claims, 3 Drawing Figures inventors
John R. Bos
Clarence A. Sorensen
Laurens Van Elzelingen
by *Michael E. Martin*
agent

RECIPROCATION DRIVE AND COUNTERWEIGHT ARRANGEMENT FOR POWER SAWS

BACKGROUND OF THE INVENTION

In hand-held reciprocating power saws and the like it is desirable to dampen the vibratory shaking forces created by the reciprocating saw blade and its associated drive mechanism. Rotating counterweight mechanisms attached to or driven by a crankshaft are not entirely satisfactory in that although the vibration caused by the reciprocating blade and drive member can be substantially reduced, lateral vibration caused by the rotating weight must be tolerated or additional mechanism added to provide canceling forces. Known types of reciprocating counterweight arrangements for power saws also tend to make the saw bulky and mechanically more complex.

Prior art arrangements of vibration damping devices for reciprocating power saws include the rotating counterweight arrangement disclosed in U.S. Pat. No. 2,988,924 to T.P. Cooley which requires additional counterweight mechanism moving at right angles to the direction of motion of the saw blade and holder. This additional mechanism is required to dampen the lateral shaking forces caused by rotating counterweights.

Drive arrangements are also known in which the vibratory forces caused by the reciprocating saw blade and drive member are opposed by an oppositely moving reciprocating counterweight such as disclosed in U.S. Pat. No. 1,648,008 to C.M. Selby et al. and U.S. Pat. No. 3,017,779 to A.P. Beals. In the Selby device the overall length of the saw is increased due to the necessary bearing support for the counterweight. The arrangement of Beals is somewhat telescoping but requires a complex arrangement of supports and connecting members for the reciprocating counterweights.

SUMMARY OF THE INVENTION

The present invention provides a drive arrangement for a reciprocating power saw or the like wherein the vibration or shaking forces caused by the reciprocating saw blade and associated drive member are substantially reduced by an oppositely moving counterweight connected to a common crankshaft for the saw blade drive and counterweight. The substantial reduction in vibration and adverse reaction forces is accomplished by an arrangement whereby the saw blade and drive member and the counterweight reciprocate in opposite directions along a common axis.

The present invention also provides a reciprocating drive and counterweight arrangement for a power saw which occupies a minimum of space due to the provision of a tubular blade drive member which slidably houses a reciprocating counterweight in oppositely moving telescoping relationship. The telescoping sliding arrangement of a cylindrical counterweight within a tubular member comprising a saw blade holder provides a structurally simple and compact arrangement that is reliable and enhances the portability and handling characteristics of reciprocating power saws. Moreover, in the reciprocating drive of the present invention a saw blade drive member serves as a bearing support for an oppositely moving reciprocating counterweight thereby eliminating the need for separate bearings and supporting structure.

DESCRIPTION OF THE PREFERRED EMBODIMENT

Figure 1:
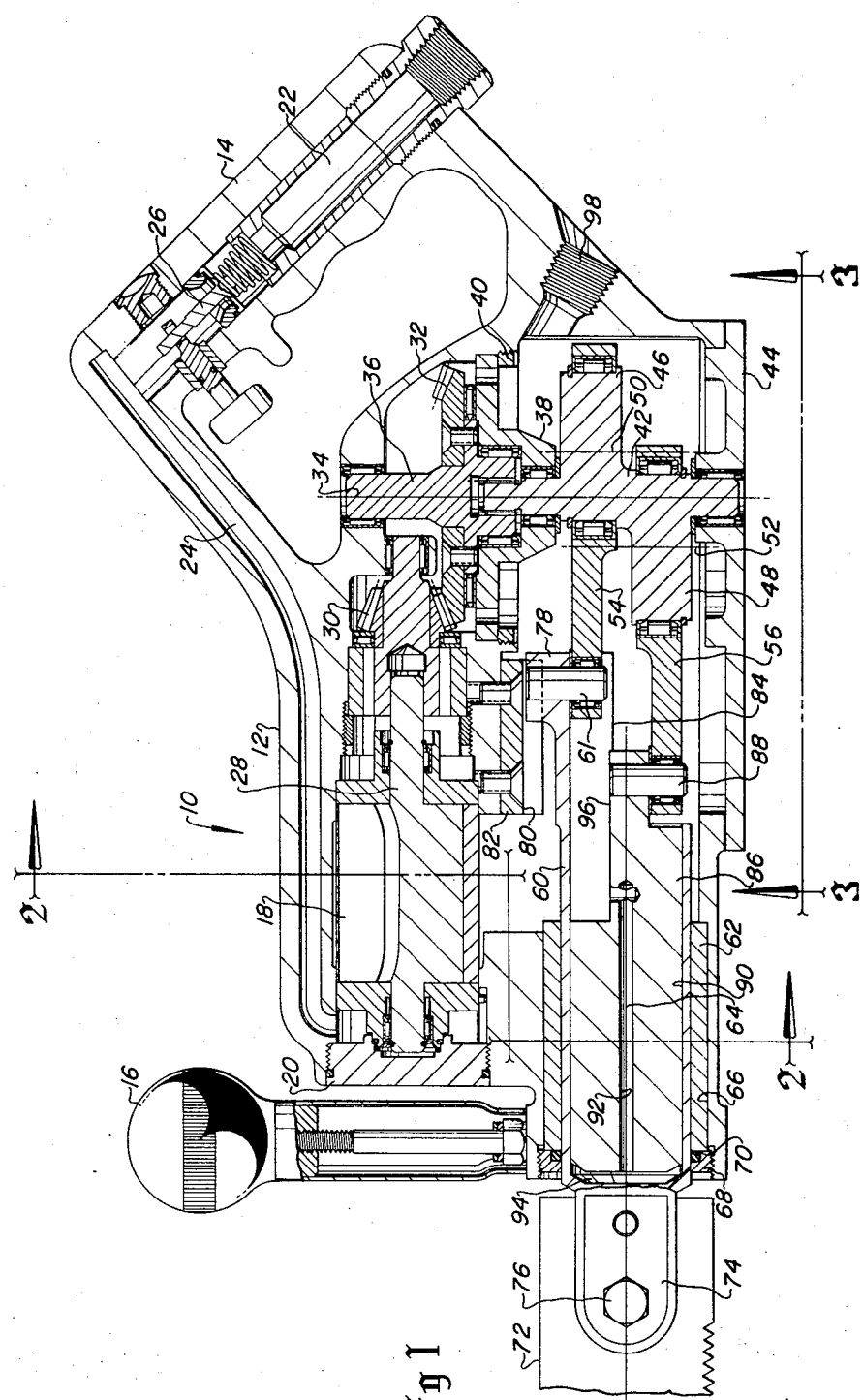
FIG. 1 is a longitudinal section view of a portable pneumatic power saw including the reciprocating drive arrangement of the present invention.
Figure 2:
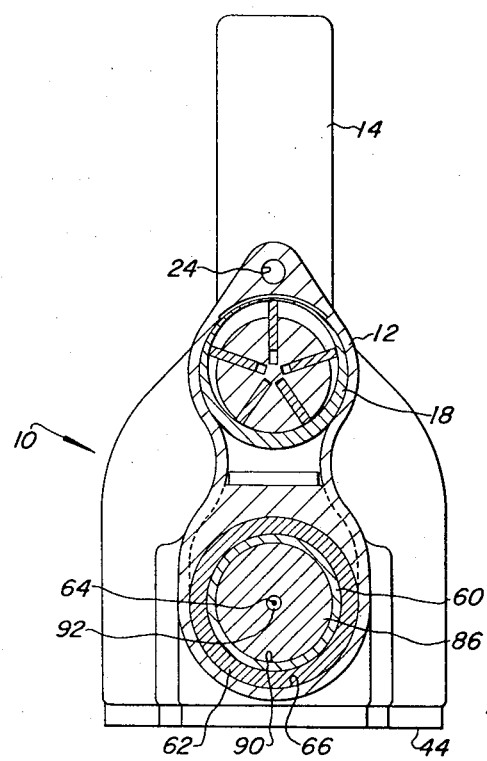
FIG. 2 is a transverse section taken along the line 2—2 of FIG. 1.
Figure 3:
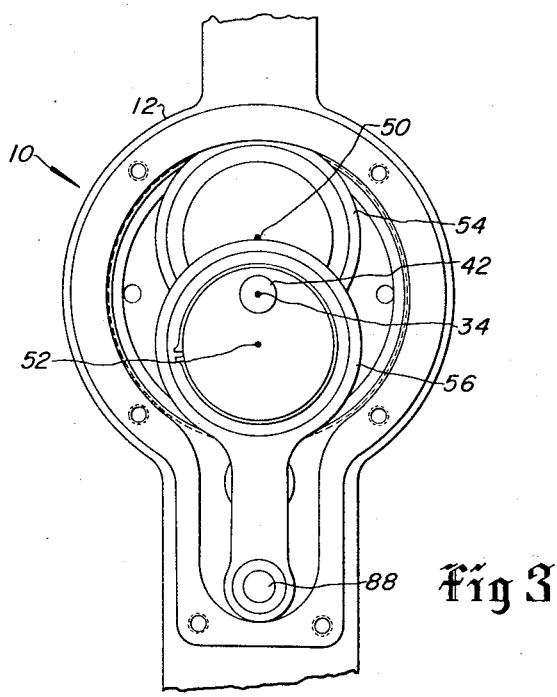
FIG. 3 is a view taken along the line 3—3 of FIG. 1 with the housing cover removed.

Referring to the drawings, a portable reciprocating power saw is illustrated and generally designated by the numeral 10. The saw 10 is designed to be operated by pressure fluid such as compressed air although other forms of motive power could be suitably adapted to operate the basic drive mechanism to be disclosed herein. The saw 10 comprises a main housing 12 having an integral handle 14 and a detachable knoblike grip 16. A pressure fluid operated motor 18 of the well known rotary vane type is suitably located within the interior of the housing 12 and retained therein by a removable cap 20. Suitable passages 22 and 24 in the housing 12 are provided for conducting pressure fluid to the motor. A digitally operated valve 26 is located on the handle 14 for controlling the flow of fluid to the motor 18. The motor 18 includes a rotor member 28 drivably connected to a bevel gear pinion 30 rotatably mounted in the housing 12. The pinion 30 is engaged with a bevel gear 32 arranged to rotate about an axis substantially perpendicular to the axis of the motor rotor 28. The bevel gear 32 includes a stub shaft portion 36 which is rotatably journaled in the housing 12. The bevel gear 32 is also rotatably supported by a bearing support member 38 retained in the housing 12 by a nut 40.

The reciprocating drive mechanism of the present invention is characterized by means for converting rotary motion into rectilinear reciprocating motion including a crankshaft 42 rotatably mounted in the bearing support member 38 and a cover member 44 removably secured to the main housing 12. The crankshaft 42 has two crank throws 46 and 48 which are spaced along and eccentric to the axis of rotation 34 of the crankshaft 42 and which are opposed to each other at 180° on a circle of revolution of the crank throw centers 50 and 52. The crank throw centers 50 and 52 are spaced equidistant on the opposite sides of the axis of rotation 34. The crank throws 46 and 48 respectively have connecting rods 54 and 56 mounted thereon and supported by suitable bearings. The connecting rods 54 and 56 are arranged in side by side in-line configuration wherein the members reciprocated by the connecting rods lie in a plane which passes through the axis 34. The connecting rod 54 is connected to an elongated tubular drive member 60 by a pin 61. The tubular member 60 is reciprocably slidable in a bearing 62 having a longitudinal axis 64. The bearing 62 is formed as a tubular bushing removably secured in a bore 66 in the housing 12 by a nut 68. The nut 68 also supports an O-ring 70 sealingly engaged with the tubular member 60. The tubular member 60 serves as a holder and drive member for a reciprocating implement comprising a saw blade 72 which is removably attached to an integral tab portion 74 by fasteners 76. The opposite end of the tubular member 60 is characterized by an integral lug 78 which serves as a support for the connecting rod pin 61 and is also slidable in a slot 80 in a guide member 82. The guide member 82 provides additional bearing support for the member 60.

As may be seen in FIG. 1 the tubular member 60 is relieved at 84 to provide clearance for the connecting rod 56 which is connected to a cylindrical reciprocating counterweight 86 by a pin 88. The counterweight 86 is dimensioned to be slidably supported on bearing means comprising the interior wall surface 90 of the tubular member 60 in telescoping relationship thereto. A passage 92 leading to the distal end of the counterweight 86 is operative to vent the chamber 94 to prevent compression of air trapped therein and to allow circulation of lubricant carrying fluid into the forward end of the tubular member 60. The counterweight 86 is also relieved at 96 to provide clearance for the movement of the connecting rod 54. As may be noted from the drawings the counterweight 86 reciprocates along the axis 64 also.

The mass of the counterweight 86 is determined to be substantially equal to the combined mass of the saw blade 72 and the tubular drive member 60 whereby the vibratory shaking forces caused by the reciprocating motion of the blade and drive member assembly are substantially counteracted by the counterweight when the saw is in operation. The coaxial arrangement of the tubular drive member and the counterweight together with the closely spaced crank throws also provides for a minimum unbalanced couple acting on the crankshaft 42.

The operation of the saw 10 is believed to be readily understandable from the foregoing description and the drawings. The drive mechanism may be lubricated by an oil mist carried by the motive air supplied to the motor 18. Motive air exhausts from the motor 18 through suitable porting, not shown, into the interior of the main housing 12 where the aforementioned oil mist bathes the mechanism located in the housing. An exhaust opening 98 is provided in the housing 12 for the final outflow of spent motive air.

As may be appreciated from the disclosure, the present invention provides a structurally simple and compact drive mechanism and counterweight thanks to the coaxially telescoping relationship of the counterweight and the saw blade drive member. Moreover, the location of the counterweight 86 within the tubular saw blade drive member 60 provides for the drive member to serve as a bearing support for the counterweight. The bushing 62 as well as the drive member and counterweight may be made of a combination of a number of well known materials suitably compatible for operation as sliding load bearing members.

It is also contemplated that a modification in the design of structural details of the reciprocating members may be made to provide for the tubular member 60 to serve as the counterweight and the cylindrical member 86 to be attached to the saw blade 72. The dimensional proportions of the respective reciprocating members would require alteration to provide suitable counterbalancing mass values.

What is claimed is:

1. In a hand-held power tool:
a housing;
a motor supported by said housing;
drive means operable to be driven by said motor for converting rotary motion into rectilinear reciprocating motion, said drive means comprising a crankshaft operable to be rotatively driven by said motor and including two spaced apart crank throws opposed to each other on opposite sides of an axis of rotation of said crankshaft, connecting rods supported on each of said crank throws in side by side in-line arrangement;
a reciprocating drive member connected to one of said connecting rods and operable to be reciprocated along an axis;
a reciprocating counterweight member connected to the other of said connecting rods and operable to be reciprocated along said axis in oppositely moving telescoping relationship with respect to said reciprocating drive member;
bearing means in said housing for supporting one of said reciprocating members with respect to said housing; and,
bearing means on said one reciprocating member for supporting the other of said reciprocating members with respect to said housing and said one reciprocating member for rectilinear reciprocating motion.

2. The invention set forth in claim 1 wherein:
said reciprocating drive member is supported by said bearing means in said housing and said reciprocating drive member includes bearing means thereon for slidably supporting said reciprocating counterweight member.

3. The invention set forth in claim 2 wherein:
said reciprocating drive member comprises an elongated tubular member including means for connecting said tubular member to one of said connecting rods and means for connecting said tubular member to a reciprocating implement.

4. The invention set forth in claim 3 wherein:
said bearing means on said reciprocating drive member comprises an interior wall surface of said tubular member.

5. The invention set forth in claim 3 wherein:
said reciprocating counterweight member comprises a substantially cylindrical member disposed within and slidably supported by said tubular member, said cylindrical member being connected to the other of said connecting rods to be driven in oppositely moving telescoping relationship with respect to said tubular member.

* * * * *